United States Patent [19]
Bradham

[11] 3,934,472
[45] Jan. 27, 1976

[54] FLUME-TYPE METERING

[75] Inventor: Allen C. Bradham, Milwaukee, Wis.

[73] Assignee: Badger Meter, Inc., Milwaukee, Wis.

[22] Filed: July 15, 1974

[21] Appl. No.: 488,307

[52] U.S. Cl. .................................. 73/215; 61/14
[51] Int. Cl.² .......................................... G01F 1/20
[58] Field of Search ............... 73/215, 216, 194 R; 61/14;18;15

[56] References Cited
UNITED STATES PATENTS

| | | | |
|---|---|---|---|
| 3,124,000 | 3/1964 | Melas | 73/215 |
| 3,427,878 | 2/1969 | Gerlitz, Jr. et al. | 73/215 |

Primary Examiner—Jerry W. Myracle
Assistant Examiner—Marcus S. Rasco
Attorney, Agent, or Firm—Neuman, Williams, Anderson & Olson

[57] ABSTRACT

A unitary molded venturi flume unit, for use in measuring liquid flow through a conduit, has a closed-end well section at one end of the flume throat and a connecting nipple section defining an access passage which extends from the lower portion of the well for sealed connection with a conduit. The walls of the throat and well sections extend substantially above the access passage and cause all liquid flowing through the conduit to flow through the throat. In use, a tranquil flow pool of the liquid is formed at the inlet side of the throat section. The depth of this tranquil flow pool exceeds the depth of normal rapid flow in the conduit, and may substantially exceed the height of the access passage and connecting conduit, for accurate measuring of flow through the conduit over a wide range of flow rates by sensing of the amplified liquid head on the inlet side of said throat.

18 Claims, 6 Drawing Figures

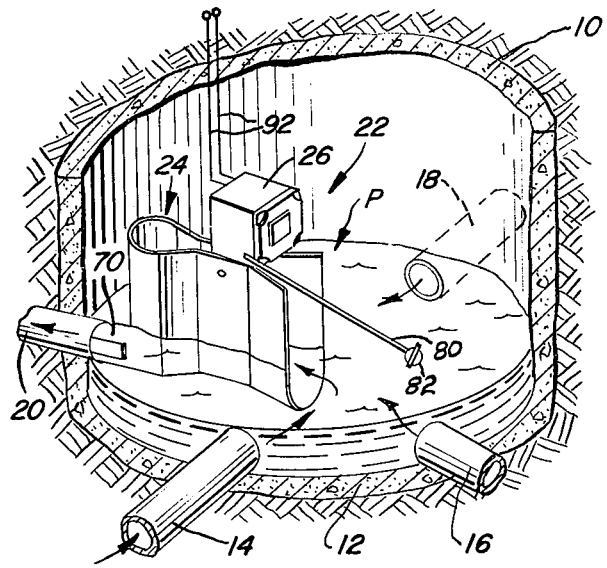
FIG. 1
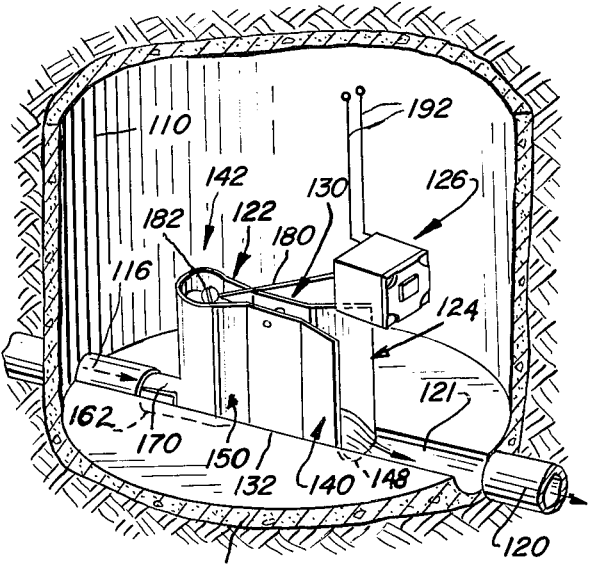
FIG. 6
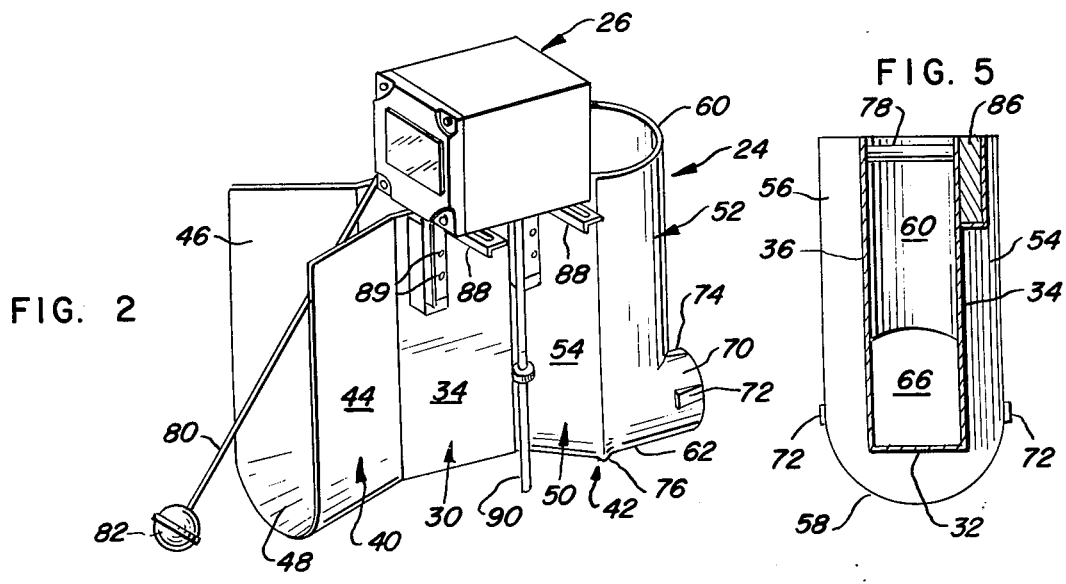

FLUME-TYPE METERING

This invention relates to metering of liquids in open channel, venturi passage, head rise meters and more particularly to flume-type metering units for use in measuring flow of liquid into and out of conduits, such as in sewer manholes.

Often it is desirable or required that a flow of liquid be metered in an open channel or reservoir space as the liquid flows to or from a restricted conduit. A primary example, to which the embodiments illustrated herein are directed, is in metering the flow in sewer lines where access to the sewage conduits is in a manhole. The need for metering apparatus and procedures for such uses have been accentuated recently because of increased attention to pollution control and specifically by regulations and laws which require measurement of effluent flow from individual facilities connected to effluent treatment systems such as municipal sewage systems.

Measurement of variable liquid flow rates through open channels and in conduits which may flow less than full, such as in typical sewage lines, requires sensing of the depth of the flowing liquid. If this depth is measured in the normal flow channels at normal flow velocities very accurate depth measurements are required. In many installations velocity measurements also are required. By imposing a flow barrier with a flow passage of known configuration, such as a weir or a flume, a slower or tranquil flow zone of increased depth may be formed upstream of the barrier. Flow rate determinations can then be made with considerable accuracy from depth or static head measurements in the tranquil zone, in accordance with known principles of hydraulic flow.

Various metering devices and systems using the noted general principles previously have been prepared for insertion in a conduit such as a sewer line to assist in measuring flow through the line. These include, for instance, devices which impose full conduit flow, as in Bennett U.S. Pat. No. 2,283,906 and Montague U.S. Pat. No. 3,633,417, open weirs and flumes within a channel, as in Clausen U.S. Pat. No. 2,028,273 and Gerlitz et al. U.S. Pat. No. 3,427,878, and other devices which rely upon measurement of the depth of flow within the cross-section of the conduit itself, as in McNulty U.S. Pat. No. 3,301,050 and Buettner U.S. Pat. No. 3,727,459. Portable dams for open channels, with limited flow passage openings, also are known, as in Waring U.S. Pat. No. 2,928,251.

Prior art devices which sought to utilize a restricted flow passage and to sense the depth of a tranquil flow pool in existing conduits and channels were limited to relatively low flow rates, as tranquil flow could not be obtained at hydraulic heads greater than the depth of the conduit or channel. Thus, measurements at high volume rates were not available or required measurements under rapid flow conditions, which normally required velocity measurements as well as depth or head measurements for accurate flow volume determinations.

Metering of flow in sewer lines imposes a number of particular operational parameters not found in other liquid flow metering circumstances. These include the requisite to handle effluent carrying solids materials of various forms and sizes without blockage or accumulation of debris. Use of moving metering elements in the flow stream preferably is to be avoided. The meter also should be self-cleaning to avoid accumulation of sand or grit. Moreover, the metering units preferably should be very simple and inexpensive to contruct and to install in existing field structures and yet should provide reliable and accurate flow measuring information in a manner facilitating remote read out.

It is an object of this invention to provide an improved arrangement for metering flow of liquid to or from a conduit.

It is another object of this invention to provide an improved device for use in metering open channel flow to or from a conduit, and particularly for use in measuring flow through a manhole in a sewage system.

It is a further object of this invention to provide an improved device in accordance with the foregoing objects and which will provide a tranquil flow zone of much greater potential depth than previous devices within the metering access area.

It is a more specific object of this invention to provide simple metering units of the flume-type which meet the aforestated objects and which provide high resolution of flow measurement by sensing of the hydraulic head over the full range of flow rates through a conduit.

It is a further object of this invention to provide a measuring unit which may be installed easily in existing manholes without substantial modifications.

It is a more specific object of this invention to provide a simple unitary "plug-in" metering unit which meets the other noted objects.

Further and additional objects and advantages will appear from the description, accompanying drawings and appended claims.

In carrying out this invention in one illustrative form, a flume unit is provided comprising a venturi throat section defined by bottom and side walls, a well section extending from one end of the throat section and including bottom, side and end walls delimiting a closed-end well in open communication with one end of the throat passage. An access opening is provided through the lower portion of the well walls for closed communication with a conduit to which the flume unit is to be joined. The venturi throat passage is of a width substantially less than the width of the access opening. In use, a tranquil flow pool is formed on the inlet side of the throat, which pool is of greater depth than the normal rapid flow stream in the connected conduit. The side and end walls of both the throat section and the closed-end well section are of a height substantially greater than and extend above the level of the top of the access opening and thereby preclude flow of liquid through said unit to or from such a connected conduit, except through the access opening and through the opposite end of the throat passage, up to a liquid level in the tranquil flow pool substantially above the top of said access opening.

For a more complete understanding of this invention, reference should now be had to the embodiments illustrated in greater detail in the accompanying drawings and described below by way of examples of the invention.

In the drawings, FIG. 1 is a perspective view, partially broken away, illustrating the lower portion of a manhole with a metering assembly employing teachings of this invention installed for measuring the flow into the outlet conduit;

FIG. 2 is a perspective view of the measuring assembly comprising the flume unit and the head measuring transmitter components shown in FIG. 1;

FIG. 3 is a top view of the flume unit of FIG. 2;

FIG. 4 is a vertical sectional view taken along line 4—4 of FIG. 3 and looking in the direction of the arrows;

FIG. 5 is a vertical sectional view taken along line 5—5 of FIG. 3 and looking in the direction of the arrows; and FIG. 6 is another view similar to FIG. 1 and showing an alternative installation for measuring the flow from the inlet conduit.

Referring now to the drawing, and more particularly to FIG. 1, there is shown the lower portion of a manhole construction comprising a cylindrical side wall 10 and a bottom wall 12 to which are connected a plurality of inlet conduits, such as at 14, 16 and 18, and an outflow conduit 20. The outlet conduit of most manholes is at the bottom of the manhole, either having its lower perimeter co-planar with the bottom floor 12, or axially aligned with a semicircular trough in the floor and thus having its center diametral plane approximately at the upper surface of the bottom floor as illustrated by the outlet 120 at the end of the trough 121 in FIG. 6. As will become apparent, the vertical location of the outlet conduit relative to the bottom of the manhole is not critical in the flow measuring operation of the illustrated metering units. However, the relative vertical position of the outlet will determine whether or not a residual pool of liquid will be retained over the bottom of the manhole when there is no flow, and the depth of any such retained pool.

A metering assembly 22 is connected to the exposed entrance end of the outlet conduit 20. The joint between the assembly 22 and the line 20 is a closed or sealed joint, and may be grouted if necessary to obtain a closed connection.

Referring also to FIGS. 2-5, the metering assembly 22 comprises a flume-type metering unit 24 on which is mounted a depth responsive transmitter 26. The metering unit 24 is a unitary molded body, such as of a glass fiber reinforced polyester resin, having an interior wall surface of a configuration to define a deep venturi flume generally similar to a Parshall flume.

The unit 24 includes a throat section 30 which is generally rectangular in cross-section, as best seen in FIG. 5, being defined by a horizontal bottom wall 32 and parallel vertical side walls 34 and 36. Sections 40 and 42 extend from opposite ends of the throat section, in alignment with the throat passage, as illustrated. The end section 40 is an open ended transition section defined by outwardly flaring vertical side walls 44 and 46 extending from side walls 34 and 36 and a curved bottom wall 48. The wall 48 is joined to the side walls 44 and 46, and its lower portion extends outwardly and downwardly from wall 32, as best seen in FIGS. 2 and 4. The distal end of wall 48 is semi-circular in cross section and of a diameter corresponding to the inner diameter of a conduit with which the assembly 22 is designed to be used, to facilitate an option of in-trough installation as in FIG. 6.

Section 42 comprises a transition portion 50 and an end closure portion 52. The portion 50 includes outwardly flaring vertical side walls 54 and 56 and a curved bottom wall 58 extending from the respective end of the throat section in the same general manner as section 40, though at somewhat different angles as best seen in FIGS. 2 and 4. End closure portion 52 includes an arcuate vertical end wall 60 extending from the side walls 54 and 56 and a horizontal arcuate bottom wall 62 which merges with the bottom wall 58 and with the end wall 60. The end portion 52 is formed with an opening 66 in its lower portion which is axially aligned with the vertical center plane of the throat section 30. A connection or mounting nipple 70 merges with the walls 60 and 62 around the opening 66, and is formed by a horizontal generally cylindrical wall which is concentric with and comprises an extension of the arcuate bottom wall 62.

The nipple 70 is designed for effecting a mating plug-in connection with an open end of a circular conduit such as the conduits 20 and 116 shown in FIGS. 1 and 6. To facilitate such a connection, the nipple is of slightly less outer diameter than the inner diameter of the connecting conduits. A pair of tapered mounting pads 72 are built up on the sides of nipple 70, and a similar but thicker pad 74 is provided at the top of the nipple. These pads have outer surfaces which extend in slightly converging angular relation to the center axis of nipple 70 and assure a firm supportive friction jam fit of the nipple in a conduit, with the lower portion of the nipple seated on the lower inner surface of the conduit end. The joint between the outer surface of the nipple 70 and the inner surface of the mating conduit 20 is grouted as necessary to obtain a closed or sealed joint connection, for purposes as will be described.

An outwardly protruding rib 76 is provided at the juncture of walls 58 and 62. The rib is of a configuration similar to the outer end of wall 48, to fit within a trough 121 (FIG. 6). The lower outer edge of wall 48 and the rib 76 are reference support areas which are finished as necessary in post-molding operations to assist in assuring proper vertical and horizontal orientation of the unit 22, and particularly the supported transmitter 26, in a normal installation.

An internal tie bar 78 is provided for mutually reinforcing the side walls of unit 24 to maintain the desired throat width over the height of the meter unit. The bar 78 comprises a hollow tube, such as stainless steel, with each of its opposite ends being split, spread out in a fan shape and embedded in the respective wall during the molding operation.

It will be appreciated that the end section 42 defines a closed well which admits of ingress and egress of liquid only through the throat passage of section 30 and through the access passage 66, up to a liquid level corresponding to the tops of the side and end walls. Moreover, these walls extend substantially above the top of the passage 66 and the connecting conduit, as shown. Thus, when the unit 24 is installed in a normal horizontal position with the opening 66 in sealed connection with an outlet conduit 20 as in FIG. 1, the unit 24 precludes flow of liquid to the connected conduit other than through the throat of section 30 throughout all liquid depths within the manhole pool P around the unit up to a maximum depth at which the surface elevation of the liquid is substantially above the conduit. In the installation of FIG. 1, the entire lower portion of the manhole 10 thus serves as a stilling pool for the metering assembly 22.

As previously noted, it is well known that the volume rate of flow of a liquid through a venturi flume of a given design and known throat width, such as the throat section of unit 24, is a predetermined function of the hydraulic head of the liquid on the inlet side of the throat. Thus, by measuring the depth of the liquid in the pool P on the inlet side of the throat section 30 when unit 24 is in use, or more technically by measuring the elevation or head of the free surface relative to the floor 32, the volume rate of flow to the conduit 20 at the time of measurement may be determined. Such a liquid level measurement may be made by a wide variety of techniques, including on-site visual observation.

However, assembly 22 is designed as a self-contained measuring assembly for use in obtaining continuous remote indication of the flow rate. To this end an electrical sensor-transmitter 26 is mounted on the unit 24. The sensor-transmitter 26 has a pivotal sensing arm 80 with a float 82 which floats on the upstream pool P (FIG. 1) such that the position of the arm 80 corresponds to the elevation of the surface of the liquid in the tranquil flow area on the inlet side of the throat section. Such sensor-transmitters are known, see e.g., Melas U.S. Pat. No. 3,124,000. Two particular commercially available devices that are suitable for use as head measuring transmitter components are inductance bridge transmitter units sold by Badger Meter, Inc. of Milwaukee, Wisconsin, under the designations "ML" and "MN." The "MN" transmitter is preferred for integral measuring assemblies wherein the transmitter is mounted directly on the flume unit in the manner of transmitter unit 26. It will be appreciated that the sensor-transmitter unit also may be mounted apart from the flume unit, such as on the wall of the manhole or on an independent support, with appropriate correlation of the head read out to the elevation of the flume throat floor.

The metering unit 24 includes provision for conveniently mounting the transmitter 26 thereon and with predetermined correlated calibration. To this end, mounting blocks 84 and 86 are embedded in the side walls 34 and 54 during the molding process. These blocks are of a material suitable for drilling and tapping e.g., blocks of wood or a compressed fibrous product such as "Benelex" sold by Masonite Corporation of Chicago, Illinois. The molding faces over these blocks may be finished to provide accurately oriented reference surfaces. A pair of mounting brackets 88 are attached to the unit 24 by screws or bolts 89 tapped into the blocks 84 and 86, and the sensor-transmitter 26 is mounted on the brackets 88. A telescopically-adjustable tubular support post 90 may be used to further support the unit 26. Electrical leads 92 extend from the transmitter to an appropriate remote read out and/or recording device.

Various flow conditions can occur in the metering unit 24. By way of example, typical free surface levels of the flow are indicated schematically by the irregular lines $L_1$, $L_2$ and $L_3$ in FIG. 4. Line $L_1$ indicates the flow level pattern at a low rate, i.e., less than one-half the capacity of the connecting conduit under rapid or free flow velocity conditions. Line $L_2$ indicates the flow level pattern at a medium flow rate which is greater than the flow volume capacity of a connecting conduit at a free flow depth of one-half the diameter of the conduit. If the flow rate exceeds the capacity of the access passage 66 or the connected conduit, a head rise will occur in the well and transition to a submergence flow condition will result. The flow condition then becomes similar to flow through a submerged outlet, with a flow pattern in unit 24 such as is indicated by line $L_3$. The flow through a unit 24 under such submergence flow conditions will follow a characteristic pool head versus flow rate relationship curve which extends for flow rates beyond the normal flume operation head versus rate curve. Moreover, the submergence flow rate relationship to head is determinable for each installation. Thus, a read out of flow rate may be obtained from the head sensed by unit 26 under submergence flow conditions as well as at free flume flow rates by appropriate calibration of the read out equipment if this is desired, such as where the submergence condition is likely to occur and specific measurement is desirable whenever those conditions do occur.

The horizontal cross-sectional area of the well section 42 should be adequate to permit free flow out of the throat up to the full flow capacity of the access passage 66 or the connected conduit, whichever is the lesser, so that the well does not constrict the rate of flow to cause a head rise at the downstream end of the throat. The well also should be of adequate area to avoid formation of a vortex in the well under submergence flow conditions.

Since the nipple 70 is a male telescopic connector designed for fitting within a connecting conduit, the inside diameter of the nipple inherently is less than the diameter of the conduit and the nipple normally will represent a more flow-restrictive zone than the conduit. Accordingly, a metering unit 24 will provide the same predeterminable flow rate-to-inlet heat head response in various installations, thereby avoiding any need for individual calibration of the sensor read out for most installations. However, other connecting joint arrangements, such as a butt joint or an over-fitting nipple, may be utilized to insure flow capacity of the metering unit equal to or greater than the capacity of the conduit if desired.

FIG. 6 illustrates an alternative embodiment and installation utilizing components of the same basic design as in FIG. 1. Accordingly, the various elements are identified by numbers in the 100 series corresponding to the number identifying the same elements in FIGS. 1-5. In this installation, there is shown a single inlet conduit 116 and a single outlet conduit 120, with the floor 112 of the manhole being formed with a semi-cylindrical open channel 121 extending between these conduits and which is intended to confine and carry the effluent flow across the manhole under normal flow conditions. The metering assembly 122 is installed with its lower portion disposed in the channel 121 and with the nipple 170 joined in the outlet end of the inlet conduit 116. The arcuate configuration of the bottom wall 162, the nipple 170, and the outer end of the bottom wall 148 conform generally to the configuration of the trough 121, to facilitate positioning and connecting of the meter by a simple drop-in, plug-in and sealing operation.

With the metering unit 122 installed in the outlet end of an inlet conduit 116 as in FIG. 6, the well defined by the end section 142 is at the inlet side of the throat section 130 and confines the inlet or stilling pool of the liquid. Thus, the closed end section 142 will cause all of the liquid from conduit 116 to flow through the throat of section 130 up to a flow rate at which the tranquil flow pool depth (head) therein exceeds the height of the well walls. By forming the walls of adequate height relative to the throat width and the flow capacity of the conduit, the unit 124 will provide measurement of the flow rate throughout the rapid flow capacity range of conduit 116. Moreover, this measuring operation is assured even though the free head or free rapid flow capacity of trough 121 is exceeded and the flowing liquid floods over the lower portion of the manhole.

The well section of unit 124 also should be of sufficient cross-section to avoid undue turbulence of the liquid in the well at normally expected flow rates. The length and slope of the side and bottom walls of the transition sections may be modified from those of unit 24, e.g., with section 150 corresponding in design to the illustrated section 40 and section 140 corresponding to the design of the illustrated section 50. The transmitter 126 is mounted in a reverse position relative to the embodiment of FIG. 1. The sensing arm extends into the closed well, with the float 182 positioned to follow the elevation of the free surface of the liquid in the well as this represents the hydraulic head causing flow through the metering throat.

In each of the meter units 24 and 124 the closed end section and flume throat section extend to a vertical elevation substantially above the top of the access opening for connecting with a conduit and hence above the uppermost portion of the connecting conduit. Accordingly, the metering unit separates the inlet and outlet flows to insure flow of all of the liquid through the throat section up to inlet pool depths substantially greater than the diameter of the access opening and of the connecting conduit, i.e., with the free tranquil surface substantially above the upper edges of the access passages and above the connecting conduits, see FIGS. 1 and 6.

Each of the metering units 24 and 124 provides a high static head rise relative to the depth of normal rapid free flow in the connected conduits and, thus, relative to the volume rate of flow. This head rise appears to be accumulated both from the hydraulic jump effect of slowing the rapidly free flowing liquid in the inlet conduit(s) to a slower flow in the stilling pool, thereby converting a portion of the kinetic flow energy to static head energy, as well as from the static head due to the higher elevation of remote portions of the inlet conduits into which the tranquil flow pool may accumulate. In any event, the large variations of static head on the inlet side of the units 24 and 124 relative to corresponding flow rate changes permits the use of conventional head measuring equipment for determining flow rate with high resolution of the flow rate measurements. Further, this accurate measuring function may be provided over the entire rapid flow rate range of the conduit, up to full conduit flow.

The subject units may be installed in a variety of environments, such as in manholes, wherein the conduit through which flow is to be measured may be in a wide variety of positions, without limiting or adversely affecting the manner in which the measuring assembly functions. A unit may be installed in a channel such as the channel 121, or in a conduit having its lower edge at the floor surface, or at a conduit opening disposed above a floor surface with appropriate means added to provide vertical support for the unit. The design of metering units 24 and 124 lends itself to one-piece units, as illustrated, which may be quickly and easily installed directly on the primary flow conduit. Moreover, such units may be lowered into a manhole and may be installed in the flow conduit system without major modification of the manhole structure, and a sensor-transmitter unit may be added simply and easily in any appropriate position to measure the liquid level on the inlet side.

The open throat flume-type design affords a self-cleaning or self-washing action in that the flow continually scours the bottom and sides of the flume, which avoids accumulation of sand, grit and other debris. Moreover, providing a flume with a raised floor, as at 32 and 132, insures that a reservoir of liquid will be maintained in the stilling pool so that the float 82 will remain afloat even if there is no flow through the throat, thereby providing a "live zero surface" operation. Finally, the subject metering units are very simple in design and thereby inexpensive to manufacture, and are compact, require only a short laying length, and are easily connected to the conduits, thereby providing simple and economical installations in existing facilities without modification of those facilities.

Several particular advantages are obtained with the preferred installation illustrated in FIG. 1. These include the fact that effluent flow from a plurality of collector lines, such as inlet conduits 14, 16 and 18, may be measured by a single metering assembly 22. Moreover, the elevation of the inlet openings relative to the outlet, relative to the floor of the manhole and relative to one another are not critical to accurate measuring of the total effluent flow. The size of the stilling pool provided by the manhole normally will preclude any need for any other steps to avoid current or dynamic flow effects on the meter. However, in the event any such effect is encountered, as from a high velocity inlet in alignment with and close to the throat passage, simple and appropriate baffling may be added.

An advantage of an installation as in FIG. 6 is that the bottom of the manhole is maintained in a "dry" condition under flow conditions up to the flow capacity of the channel 121, which normally is equal to about one-half of the free head capacity of the outlet conduit 120.

The width of the flume throat in the units 24 and 124 for use in sewage lines preferably is within the range of from about 1.5 inches up to about one-half the nominal diameter of the access passage 66 and of the conduit to which the unit is to be connected. The minimum throat size of about 1.5 inches is desired in sewage metering applications to provide reasonable assurance of passage of solids materials without undue risks of accumulation of debris and blockage of the metering unit. Within the throat range indicated, a relatively high head rise will be obtained in the stilling pool as related to the flow rate through the metering unit. This in turn will provide the high degree of resolution for the depth sensing element and hence of the flow rate measurement noted above. The side walls should be of a height to insure separation of the stilling pool from the access connection without overflow of the side walls, up to rapid flow capacity of the connecting conduit. Thus, the required wall height is related to the selected throat width, and in all instances will substantially exceed the diameter of the connecting conduit. By way of particular examples, wall heights of about 20 inches, as measured from a horizontal reference plane defined by the outer edge of the wall 48 and the rib 76, have been found satisfactory for metering units 24 having outlet openings through the nipples 70 of 5 inches, 7 inches, 9 inches and 11 inches for connection with 6 inch, 8 inch, 10 inch and 12 inch conduits 20, respectively. Moreover, such 20 inch units readily pass through typical manhole access openings, thereby permitting installation of one-piece prefabricated units in existing manholes.

By way of further specific examples, the following table enumerates various other dimensions for the aforementioned 6 inch, 8 inch 10 inch and 12 inch metering units, having reference to the dimensions indicated by the letters A, B, C, D, F, H, T and W in FIGS. 3 and 4.

TABLE I (All Dimensions in Inches)

| Size | Throat Width T | Well Width & Outlet Dia W | Throat Height H | Horizontal Floor F | Transition Section 40 A | Throat Length B | Transition Section 50 C | Closure Length D |
|------|------|------|------|------|------|------|------|------|
| 6  | 1.5 | 5.0  | 1.75 | 4.1  | 6.0 | 3.0  | 3.0 | 3.5 |
| 6  | 1.75| 5.0  | 1.75 | 4.1  | 5.6 | 3.6  | 2.8 | 3.5 |
| 6  | 2.0 | 5.0  | 1.75 | 4.1  | 5.3 | 4.1  | 2.6 | 3.5 |
| 8  | 1.5 | 7.0  | 2.25 | 7.3  | 6.0 | 4.0  | 3.0 | 4.5 |
| 8  | 2.5 | 7.0  | 2.25 | 7.3  | 4.9 | 5.6  | 2.5 | 4.5 |
| 8  | 3.5 | 7.0  | 2.25 | 7.3  | 3.8 | 7.3  | 1.9 | 4.5 |
| 10 | 1.5 | 9.0  | 2.75 | 9.2  | 6.0 | 5.0  | 3.0 | 5.5 |
| 10 | 2.5 | 9.0  | 2.75 | 9.2  | 5.2 | 6.2  | 2.6 | 5.5 |
| 10 | 3.5 | 9.0  | 2.75 | 9.2  | 4.4 | 7.4  | 2.2 | 5.5 |
| 10 | 5.0 | 9.0  | 2.75 | 9.2  | 3.2 | 9.2  | 1.6 | 5.5 |
| 12 | 1.5 | 11.0 | 3.25 | 10.3 | 6.0 | 6.0  | 3.0 | 5.5 |
| 12 | 2.5 | 11.0 | 3.25 | 10.3 | 5.4 | 6.9  | 2.7 | 5.5 |
| 12 | 3.5 | 11.0 | 3.25 | 10.3 | 4.7 | 7.9  | 2.4 | 5.5 |
| 12 | 4.5 | 11.0 | 3.25 | 10.3 | 4.1 | 8.8  | 2.1 | 5.5 |
| 12 | 6.0 | 11.0 | 3.25 | 10.3 | 3.2 | 10.3 | 1.5 | 5.5 |

It will be obvious that various modifications of the specific embodiments shown may be made without departing from the spirit and scope of this invention. For example, various head sensing and indicating devices may be used in place of transmitter 26, various flow restricting throat designs may be utilized in the metering unit, and various arrangements may be devised for effecting the closed or sealed joint connection between the access passage of the well and the conduit to which the metering unit is to be connected. The transition sections of the flume units may be of various configurations, dependent upon the flow conditions desired. The illustrated tapered design represents a hydraulically prudent approach intended to approximate smooth linear flow into, through and out of the throat.

It will thus be seen that a metering unit and metering assemblies have been provided which meet the objects of this invention.

While particular embodiments of this invention are shown and described herein, it will be understood, of course, that the invention is not to be limited thereto since many modifications may be made by those skilled in the art, particularly in light of the foregoing teachings. It is contemplated, therefore, by the appended claims, to cover any such modifications as fall within the true spirit and scope of this invention.

What is claimed is:

1. A flume unit for use in measuring liquid flow through a conduit, said flume unit comprising a throat section including bottom and side walls defining a venturi throat passage, a well section extending from one end of said throat section and including bottom, side and end walls defining a closed-end well in open communication with one end of said throat passage, said well section being formed with an opening through the lower portion of said section for liquid passage communication with such a conduit, and said side and end walls of said throat section and said well section being of a height substantially greater than and extending above the level of the top of said opening, said walls thereby precluding flow of liquid through said unit to or from such conduit, except through said opening and through the end of said throat passage opposite said well section, up to a liquid level substantially above the top of said opening.

2. A flume unit as in claim 1 formed of a unitary body.

3. A flume unit as in claim 2 wherein said body includes means for mounting a liquid level sensor thereon.

4. A flume unit as in claim 1 including a cylindrical connector extending from said opening for closed communication with such a conduit.

5. A flume unit as in claim 1 in which said well is of a width substantially greater than the width of said throat passage.

6. A flume unit as in claim 5 in which said well is of a width of at least as great as the diameter of said opening.

7. A flume unit as in claim 6 wherein said well includes a transition section defined by side walls diverging from one another outwardly from said throat section.

8. A flume unit as in claim 1 wherein said well is of a size and configuration to accommodate free flow passage of a stream of fluid at a volume rate equal to or greater than the free flow capacity of said opening.

9. A flume unit as in claim 7 wherein said well is of a horizontal cross section at least as great as the area of said opening.

10. A metering assembly comprising a flume unit as in claim 1 including means for mounting a liquid level sensor thereon, and a liquid level sensor mounted on said means.

11. In combination with a reservoir and at least one restricted conduit communicating at one end with said reservoir, a flume unit for use in measuring liquid flow through said conduit to or from said reservoir, said flume unit comprising a throat section including bottom and side walls defining a venturi throat passage, a well section extending from one end of said throat section and including bottom, side and end walls defining a closed-end well in open communication with one end of said throat passage, said well section being formed with an opening through the lower portion of said section, means forming a closed conduit connection between said opening and said one end of said conduit for liquid passage communication between said well and said conduit, and said side and end walls of said throat section and said well section being of a height substantially greater than and extending above the level of the top of said opening, said walls thereby precluding flow of liquid through said unit to or from said conduit, except through said opening and through the end of said throat passage opposite said well section, up to a liquid level substantially above the top of said opening.

12. In a combination as in claim 11, said throat passage being of a width substantially less than the width of said opening and said side walls thereof being of a height to define a venturi passage having a free liquid flow capacity at least as great as the free liquid flow capacity of said conduit.

13. In a combination as in claim 12, said well being of a width substantially greater than the width of said throat passage.

14. In a combination as in claim 11, said bottom wall of said venturi throat passage being above the lowermost surface of said reservoir, and a liquid level sensor unit having a float sensor element disposed over said lowermost surface for floating in liquid thereover.

15. A combination as in claim 11 wherein said reservoir is a manhole and said conduit is an outlet conduit from said manhole, said manhole around said unit forming a stilling well for said flume unit.

16. A combination as in claim 15 including a liquid level sensor-transmitter mounted for sensing the level of the free liquid surface in said manhole outside of said unit and providing an output signal in accordance with such sensed level for remote read out of the flow rate to said conduit through said throat passage.

17. A combination as in claim 11 wherein said reservoir is a manhole and said conduit is an inlet conduit to said manhole.

18. A combination as in claim 17 including a liquid level sensor-transmitter mounted for sensing the level of the free liquid surface in said well and providing an output signal in accordance with such sensed level for remote read out of the flow rate from said conduit through said throat passage.

* * * * *

UNITED STATES PATENT OFFICE
CERTIFICATE OF CORRECTION

PATENT NO. : 3,934,472

DATED : January 27, 1976

INVENTOR(S) : Allen C. Bradham

It is certified that error appears in the above-identified patent and that said Letters Patent are hereby corrected as shown below:

Column 5, line 55, after "low" insert -- flow --. Column 6, line 27, delete "heat" before -- head --. Column 7, line 27, before "surface" insert -- flow --. Column 9, line 67, before "conduit" insert -- a --. Column 10, line 32, delete "of" (first occurrence).

Signed and Sealed this fourth Day of May 1976

[SEAL]

Attest:

RUTH C. MASON
Attesting Officer

C. MARSHALL DANN
Commissioner of Patents and Trademarks